United States Patent [19]

Pierce

[11] Patent Number: 5,256,490
[45] Date of Patent: Oct. 26, 1993

[54] HIGH OPACITY FLEXIBLE COMPOSITE MATERIAL

[75] Inventor: Richard J. Pierce, Plymouth, Mass.

[73] Assignee: Bainbridge/Aquabatten, Inc., Canton, Mass.

[21] Appl. No.: 911,614

[22] Filed: Jul. 10, 1992

[51] Int. Cl.⁵ .............................................. B32B 15/08
[52] U.S. Cl. .................... 428/458; 116/173
[58] Field of Search ............... 428/246, 458, 261, 263; 116/173

[56] References Cited

U.S. PATENT DOCUMENTS 4,705,717 11/1987 Cain ..................................... 428/246
4,987,848 1/1991 Todd ................................... 116/173

FOREIGN PATENT DOCUMENTS 58-51147 3/1983 Japan .

Primary Examiner—Thomas J. Herbert, Jr.
Attorney, Agent, or Firm—Watson, Cole, Grindle & Watson

[57] ABSTRACT

A high opacity flexible composite material is receptive to printing on opposing outer surfaces without a printed image on one surface being visible from the other and without a printed image on the other surface being visible on the one surface, the composite having outer ink printable layers with at least one intermediate polyester film layer adhesively bonded to one of the layers, the intermediate layer consisting of polyethylene terephthalate, and a metallized coating of aluminum on the intermediate layer having a total optical density in the range of 1.70 to 9.99, wherein one of the outer layers is bonded to the intermediate layer, and the other outer layer is bonded to the metallized coating.

13 Claims, 1 Drawing Sheet

HIGH OPACITY FLEXIBLE COMPOSITE MATERIAL

BACKGROUND OF THE INVENTION

This invention relates to a flexible composite material having a total optical density in the range of 1.70 to 9.99, or a percent light transmittance in the range of 1.995 to less than 0.0100. The high opacity quality of the material is such that when ink is printed on opposite outer surfaces thereof a printed image on one side remains invisible from the other side even when the material is held up to a light source.

The high opacity flexible composite material according to the invention is useful, for example, as a rooter flag or a banner. The material may also be used as hang-tags applied to various articles offered for sale and is useful, for example, as a tear-resistant and water resistant outdoor sign.

When the highly opaque material of the invention is ink printed on opposing outer surfaces for use, for example, as an Olympic rooter flag having the Olympic rings emblem on one side and a different logo on the other side such that, and when held up to a light source, the logo side cannot be seen from the emblem side, and the emblem side cannot be seen from the logo side.

The material must therefore be receptive to printing on opposite sides without any "bleed through" using an ink transfer process, for example, without undue shrinkage, buckling, delamination or other undesirable side effects.

The material must be sufficiently flexible to exhibit an appropriate "fly" quality, i.e., a characteristic relating to the manner in which the material flutters in the wind to achieve an aesthetically pleasing quality. Also, the material must be lightweight and supple and not prone to retaining a curl after being rolled up for any prolonged period of time.

SUMMARY OF THE INVENTION

It is therefore an object of the present invention to provide a high opacity/low light transmittant flexible composite material receptive to print ink on opposing outer surfaces such that a printed image on one surface is invisible from the opposite surface and a printed image on the opposite surface is invisible from the one surface. The present composite material has all the characteristics aforedescribed such as its capability of withstanding the high temperature involved in a heatable ink transfer process without undue shrinkage, buckling, delamination or other undesirable side effects. The material is lightweight and supple having a flutter quality and is not prone to curl retention even after being rolled up for a prolonged period of time.

Other objects, advantages and novel features of the invention will become more apparent from the following detailed description of the invention when taken in conjunction with the accompanying drawings.

DETAILED DESCRIPTION OF THE INVENTION

Figure 1:
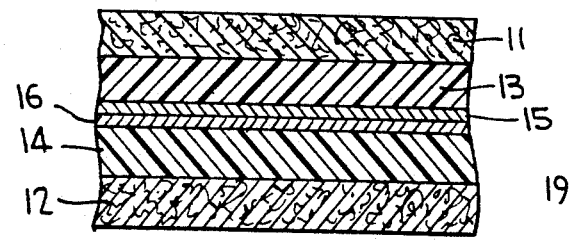
FIG. 1 is a cross-sectional view of a portion of a highly opaque flexible composite material according to one embodiment of the invention.

Turning now to the drawings wherein like reference characters refer to like and corresponding parts throughout the several views, the flexible composite material or substrate according to one embodiment of the invention is generally designated 10 in FIG. 1 as comprising a pair of outer ink printable layers 11 and 12 which can include woven, knitted and non-woven synthetic and natural fiber, fabrics and papers.

The composite includes a first intermediate polyester film layer 13 of Mylar which is a polyethylene terephthalate (PET).

A standard grade of 1.0 mil "White" polyester film of this type has an optical density of 0.70 to 1.50 which correlates to a percent light transmittance in the range of 19.95 to 3.162. A standard grade of 1.0 mil "optically clear" polyester film of this type has an optical density of 0.04 which correlates to a percent light transmittance in the range of 79.43 to 100.00. A standard gauge of 1.0 mil "general purpose" polyester film of this type has an optical density of 0.05 to 0.07 which likewise correlates to a percent light transmittance in the range of 79.43 to 100.00. A "Black" polyester film of this type considered truly opaque has an optical density of 6.0.

Any of the Mylar films among the above examples can be selected for the composites according to the invention, although for the "Black" film a techique may need to be established of preventing a grey cast on the composite's outer surface.

The composite includes a second intermediate layer 14 of Mylar film essentially the same as layer 13.

Layer 13 is adhesively bonded to outer layer 11, and layer 14 is adhesively bonded to outer layer 12. The adhesive system which may be used to bond the outer layers to the Mylar films is a polyester thermoset, consisting of a polyester solution and an isocyanate terminated prepolymer curing agent.

The adhesives selected should have a functional purpose in that they cannot blister, bubble, delaminate, shrink, etc., when exposed to high temperatures which may be involved in the sublimation printing process. Thus, any adhesives having these characteristics are suitable for use in the adhesive system to laminate the outer layers 11 and 12 respectively to the Mylar films 13 and 14.

Also, a non-yellowing adhesive may be necessary in laminated products which undergo outdoor exposure so as to prevent discoloration of the original product. Such an adhesive system is aliphatic, although an aromatic adhesive system could be effectively used.

Intermediate layer 13 has a metallized layer 15 of aluminum or other suitable metal vacuum deposited thereon as in known manner. The amount of aluminum vacuum deposited on the Mylar film may be measured in terms of its optical density rather than by thickness in angstroms.

Optical density is measured using a MacBeth densitometer with a green filter such that an optical density of 2.00, for example, can be determined as approximately equivalent to 122 angstroms thickness and 1.00 percent of light transmittance.

A metallized layer 16 of aluminum or other suitable metal is vacuum deposited on Mylar film 14 and is essentially the same as that described with reference to metallized film 15.

The range of total optical density for each metallized Mylar film is in the range of 1.70 to 9.99 which corresponds to a range of 1.995 to less than 0.010 percent light transmittance.

As shown in FIG. 1, there is metal-to-metal contact between metallic films 15 and 16. The contacting metallized films are adhesively bonded together utilizing a system which may be a polyester thermoset. The adhesive system used to bond outer layers 10 and 12 to Mylar films 13 and 14, respectively, is also a polyester thermoset, consisting of a polyester solution and an isocyanate terminated prepolymer curing agent.

The adhesive system selected may have a functional purpose in that they will not blister, bubble, delaminate, shrink, etc., when exposed to high temperatures involved in the sublimation printing process. Thus, other adhesives are suitable for this purpose.

A non-yellowing adhesive may be desirable for laminated products which may undergo outdoor exposure to thereby prevent discoloration of the original product. Thus, an aliphatic adhesive is used.

However, if the end use of the product does not place it in such conditions for extended periods of time then an aromatic system could be applied as the adhesive just as effectively.

By utilizing a pair of metallized Mylar films in metal-to-metal contact, the use of more metal plating is made possible than with a single layer. Another factor in utilizing a pair of metallized film is the security of maintaining opacity in the event one of the metal layers cracks due to poor adhesion. However, a single layer of metallized Mylar likewise serves as an adequate blackout layer for the flexible composite generally designated 17 in FIG. 2.

This composite has outer layers 18 and 19 similar to outer layers 11 and 12 described with reference to FIG. 1 and likewise receptive to printing ink images on the outer surfaces thereof as described with reference to composite 10.

Composite 17 has a single intermediate layer 21 of Mylar film adhesively bonded to outer layer 18, the adhesive system being a polyester thermoset consisting of a polyester solution and an isocyanate terminated prepolymer curing agent.

The Mylar film has a thin aluminum or other suitable metallic layer 22 vacuum deposited thereon, the metal deposition having a total optical density in the range of 1.70 to 9.99 which corresponds to a light transmittance in the range of 1.995 to less than 0.010 percent. The adhesive system between metallized layer 22 and outer layer 19 can be the same adhesive system between the Mylar film 21 and outer layer 18.

Figure 2:
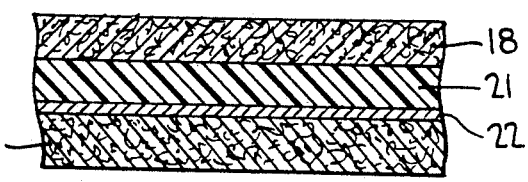
FIGS. 2, 2A and 3 are views similar to FIG. 1 of other embodiments according to the invention.
Figure 2A:
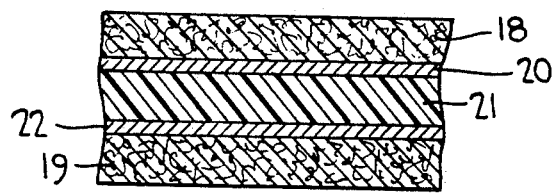

Composite 17A shown in FIG. 2A is similar to composite 17 except that the Mylar film has thin aluminum or other suitable metallic layers 20 and 22 vacuum deposited on opposing surfaces thereof. The metal deposition has a total optical density of 1.70 to 9.99. This intermediate layer is bonded between the ink receptive layers 18 and 19 in the same manner as described with reference to FIG. 2 and with reference to layers 11 and 12 of FIG. 1.

By having two metallized layers vacuum deposited, the risks associated with poor adhesion of a simple metallized layer are minimized.

Figure 3:
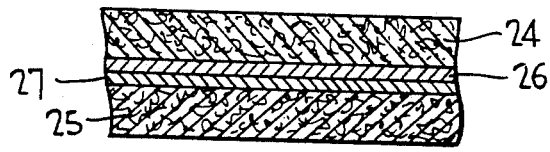

Another embodiment according to the invention is shown in FIG. 3 as a composite 23 having outer layers 24 and 25 similar to outer layers 11 and 12 described with reference to FIG. 1 and likewise receptive to printing ink images on the outer surfaces of thereof as described with reference to composite 10.

Composite 23 has two intermediate film layers 26 and 27 of aluminum or other suitable metal film which are respectively bonded, adhesively, to layers 24 and 25. And, films 26 and 27 are adhesively bonded together.

Each aluminum film 26 and 27 has a total optical density in the range of 1.70 to 9.99, and the adhesive bonding system is the same or similar as that described with reference to the FIGS. 1 and 2 embodiments.

Figure 4:
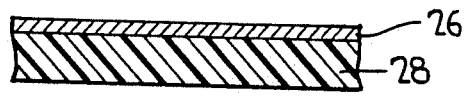
FIG. 4 is a sectional view of a starter layer used in producing the FIG. 3 composite.

Each metallized film for the FIG. 3 composite 23 is first vacuum deposited on a Mylar film 28 as in the normal manner except that a release agent of known type is first applied to the Mylar film 28 after which thin layer 26 is vacuum deposited thereon and subsequently applied to and bonded on layer 24 after which the Mylar film is removed. Metallized layer 27 is of course applied in the same manner as with reference to FIG. 4.

The composite material according to the invention has a number of attributes, among these being low weight, low bulk (thin), high temperature stability, printablity and extremely low light transmission/high opacity, wherein an image can be printed on one side and remain invisible on the other. Another quality is its flutter or fly capability rendering it especially useful as a rooter flag or the like.

Other end uses are possible, such as banners, hang-tags, signs, and the like.

Obviously, many other modifications and variations of the present invention are made possible in the light of the above teachings. It is therefore to be understood that within the scope of the appended claims the invention may be practiced otherwise than as specifically described.

What is claimed is:

1. High opacity flexible composite material receptive to print ink on opposing outer surfaces of the material without the print ink on one of the outer surfaces being visible from the other surface thereof and without the print ink on the other outer surface being visible from the one outer surface, the material comprising a pair of outer ink printable layers, an intermediate polyester film layer adhesively bonded to one of said outer layers, said intermediate layer consisting of polyethylene terephthalate, a metallized coating of aluminum on said intermediate layer, said metallized layer being adhesively bonded to the other of said outer layers, and the metallized layer having a thickness approximately equivalent to a total optical density in the range of 1.700 to 9.99.

2. The composite material according to claim 1, wherein the total optical density of the metallized layer is in the range of 2.00 to 9.99.

3. The composite material according to claim 1, wherein the adhesive bond between said intermediate layer and said other outer layer consists of a polyester solution and an isocyanate terminated prepolymer curing agent forming a polyester thermoset adhesive bond.

4. High opacity flexible composite material receptive to print ink on opposing outer surfaces of the material without the print ink on one of the outer surface being visible from the other surface thereof and without the print ink on the other surface being visible from the one outer surface, the material comprising a pair of outer ink printable layers, a first intermediate polyester film layer adhesively bonded to one of said outer layers, a second intermediate polyester film layer adhesively bond to the other of said outer layers, each said intermediate layer consisting of polyethylene terephthalate, metallized coatings of aluminum respectively on said intermediate layers, said metallized coatings being adhesively bonded to one another, and said coatings each having a thickness approximately equivalent to a total optical density in the range of 1.70 to 9.99.

5. The composite material according to claim 4, wherein the total optical density of said coatings layer is in the range of 2.00 to 9.99.

6. The composite material according to claim 4, wherein the adhesive bond respectively between said first and second layers and said outer layers consists of a polyester solution and an isocyanate terminated prepolymer curing agent forming a polyester thermoset adhesive bond.

7. The composite material according to claim 4, wherein the adhesive bond between said metallized coatings consists of a polyester thermoset.

8. High opacity flexible composite material receptive to print ink on opposing outer surfaces of the material without the print ink on one of the outer surfaces being visible from the other surface thereof and without the print ink on the other outer surface being visible from the one outer surface, the material comprising a pair of outer ink printable layers, a first intermediate metallized film of aluminum adhesively bonded to one of said outer layers, a second intermediate metallized film of aluminum adhesively bonded to the other of said other layers, said first and second films being adhesively bonded together, each of said films having a thickness approximately equivalent to a total optical density in the range of 1.700 to 9.99.

9. The composite material according to claim 8, wherein the total optical density of said films is in the range of 2.00 to 9.99.

10. The composite material according to claim 8, wherein the adhesive bond respectively between said first and second films and said outer layers, and between said films, consists of a polyester solution and an isocyanate terminal prepolymer curing agent forming a polyester thermoset adhesive bond.

11. High opacity flexible composite material receptive to print ink on opposing outer surfaces of the material without the print ink on one of the outer surfaces being visible from the other surface thereof and without the print ink on the other outer surface being visible from the one outer surface, the material comprising a pair of outer ink printable layers, an intermediate polyester film layer, metallized coatings of aluminum respectively on opposing surfaces of said intermediate layer, said metallized layers being respectively adhesively bonded to said outer layers, and the metallized layers each having a thickness approximately equivalent to a total optical density in the range of 1.700 to 9.99.

12. The composite material according to claim 11, wherein the total optical density of the metallized layer is in the range of 2.00 to 9.99.

13. The composite material according to claim 11, wherein the adhesive bond between said metallized coatings and said outer layers consists of a polyester solution and an isocyanate terminated prepolymer curing agent forming a polyester thermoset adhesive bond.

* * * * *